United States Patent [19]

Feinland

[11] Patent Number: 4,849,918

[45] Date of Patent: Jul. 18, 1989

[54] WEIGHING INSTRUMENT HAVING ADAPTIVE BREAKPOINTS

[75] Inventor: Seymour Feinland, Stamford, Conn.

[73] Assignee: Pitney Bowes Inc., Stamford, Conn.

[21] Appl. No.: 139,880

[22] Filed: Dec. 30, 1987

[51] Int. Cl.⁴ ..................... G01G 19/413; G06F 15/20
[52] U.S. Cl. .................................. 364/567; 177/25.15
[58] Field of Search ...................... 364/464.02, 464.03, 364/466, 567, 745; 177/25.15

[56] References Cited

U.S. PATENT DOCUMENTS

| | | | |
|---|---|---|---|
| 3,951,221 | 4/1976 | Rock | 177/25.15 X |
| 4,047,006 | 9/1977 | Ellner | 177/25.15 X |
| 4,143,724 | 3/1979 | Itani | 364/567 X |
| 4,200,896 | 4/1980 | Baumann | 364/567 X |
| 4,219,089 | 8/1980 | Gard et al. | 364/567 X |
| 4,412,298 | 10/1983 | Feinland et al. | 364/567 |
| 4,509,608 | 4/1985 | Hikita | 364/466 X |
| 4,632,254 | 12/1986 | Scopatz | 364/567 X |

OTHER PUBLICATIONS

Cox et al: Machine Round-Off of Numbers, IBM Technical Disclosure Bulletin. vol. 7 No. 12, May 1965 pp. 1178/1179.

*Primary Examiner*—Felix D. Gruber
*Attorney, Agent, or Firm*—Peter Vrahotes; David E. Pitchenik; Melvin J. Scolnick

[57] ABSTRACT

A weighing instrument is provided with two sets of breakpoints; "generic breakpoints" which fall at the midpoint of successive display intervals, and "postal breakpoints" which fall at or near one of the two successive display intervals. Under "normal" circumstances, the postal breakpoints are in place and the instrument is used as a "weight classifier". When it is sensed that the "weighing history" of the instrument is such that weighing errors due to "creep" will affect the accuracy of the instrument, and will be augmented by the bias inherent in the use of postal breakpoints, the generic breakprints are instituted. An example of a weighing history of a nature that the generic breakpoints should be implemented is the application of a "large" weight (such as 75% of full range) to the instrument for a "long" time (such as in excess of 30 seconds). The postal breakpoints are reimplemented in the instrument upon a return to substantially zero weight on the instrument.

Method and apparatus are disclosed.

14 Claims, 2 Drawing Sheets

GENERIC BREAKPOINTS

POSTAL BREAKPOINTS

WEIGHING INSTRUMENT HAVING ADAPTIVE BREAKPOINTS

TECHNICAL FIELD OF THE INVENTION

The invention relates to electronic measuring instruments for weighing articles.

BACKGROUND OF THE INVENTION

Measuring instruments, most notably those having a digital display of the measured parameter, typically "round up" to the higher of two successive display intervals any measured value which is greater than the midpoint of the two display intervals. A "breakpoint" is the point at which such rounding up is set to occur. For measured values less than the breakpoint, the lower of two successive intervals is displayed. For purposes of this discussion, when the breakpoints in a measuring instrument are set at the midpoint of successive display intervals, they are termed "generic breakpoints", and a weighing instrument employing generic breakpoints is termed a "scale". Such generic breakpoints, located at the midpoint of successive display intervals, are very typical and provide the least bias in measurement since they favor neither the higher or the lower display interval.

In certain applications, generic breakpoints are not well suited to a weighing instrument. For instance, when weighing mail it is important to know weight "up to" a postal rate break, such as one or two ounces. The same is generally true of packages, with respect to rate changes at integral pound intervals. Thus, in the United States, the breakpoints for a weighing instrument are set at, or just above the lower of two successive display intervals. (If set just above the lower interval, the offset is based on the maximum measuring error expected to be inherent in the weighing instrument.) In this manner, a mailpiece weighing 1.2 ounces, for instance, would register 2 ounces, for successive display intervals of "1" and "2" ounces. In practice, a postal weighing instrument displays weight in tenths of ounces, but the principle illustrated is still valid. For purposes of this discussion, when the breakpoints in a measuring instrument are set closer to one of two successive display intervals, rather than substantially at the midpoint thereof, they are termed "postal breakpoints", and a weighing instrument employing postal breakpoints is termed a "weight classifier". It should be noted that in certain countries other than the United States, the postal breakpoints are set at or near (within expected error) the higher of the two successive display intervals, since the postal rate structures are different.

The inventor has recognized that the bias inherent in the establishment of postal breakpoints at or near the lower (or higher) of successive display intervals, rather than at the midpoint thereof, may lead to a perceived discrepancy in the accuracy of the weighing instrument by a user accustomed to instruments employing generic breakpoints.

Thus, it is an object of this invention to provide a weighing instrument with breakpoints that are adaptive to the actual use or weighing history of the instrument.

SUMMARY OF THE INVENTION

According to the invention a weighing instrument is provided with two sets of breakpoints; "generic breakpoints" which fall at the midpoint of successive display intervals, and "postal breakpoints" which fall at or near one of the two successive display intervals. Under "normal" circumstances, the postal breakpoints are in place and the instrument is used as a "weight classifier". When it is sensed that the "weighing history" of the instrument is such that weighing errors due to "creep" will affect the accuracy of the instrument, and will be augmented by the bias inherent in the use of postal breakpoints, the generic breakpoints are instituted. An example of a weighing history of a nature that the generic breakpoints should be implemented is the application of a "large" weight (such as 75% of full range) to the instrument for a "long" time (such as in excess of 30 seconds). The postal breakpoints are reimplemented in the instrument upon a return to substantially zero weight on the instrument.

Method and apparatus are disclosed.

Other objects, features and advantages of the invention will become apparent in light of the following description thereof.

DETAILED DESCRIPTION OF THE INVENTION AND BEST MODE FOR CARRYING OUT SAME

Figure 1:
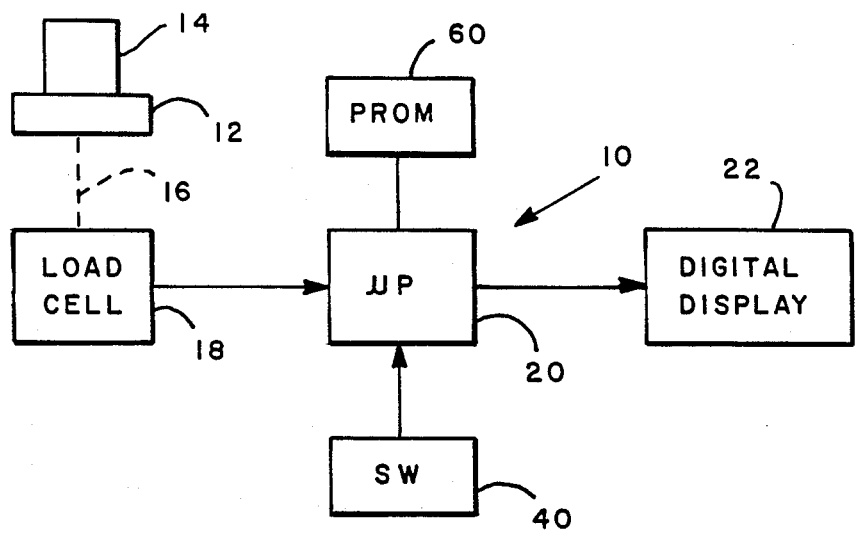
FIG. 1 is a schematic of the weighing instrument of this invention.

FIG. 1 shows an electronic weighing instrument 10 having a platen 12 upon which an article 14, such as a mailpiece or a package is placed for weighing. The platen 12 exerts a force via a linkage 16 on a load cell 18 which, in response thereto, provides a signal to scale circuitry 20, such as a microprocessor. The microprocessor 20 drives a display device 22, such as a digital readout device, to display the weight of the article.

Advantageously the load cell 18 is a strain gauge based arrangement which is simple and inexpensive to manufacture. However, load cells will inevitably suffer from linearity, hysteresis and creep inaccuracies. Compensating for these inaccuracies is a function of accuracy desired, and could require complex compensation algorithms, such as in software for the microprocessor 20 which could negate any advantage gained by he use of a load cell of moderate cost.

In the exemplary weighing instrument described herein, it will be assumed that a moderate cost load cell is employed and, that with a minimum amount of compensation involved, an accuracy of one part in sixteen hundred (1:1600) can be effectively achieved in both of two weighing ranges, a low range and a high range. Such a scale is described in greater detail in commonly-owned U.S. patent application No. (Ser. No. 116,936), filed Nov. 4, 1987, entitled MULTIRANGE ELECTRONIC WEIGHING SCALE FOR TYPE-APPROVAL, which discloses a manually operable switch connected to the microprocessor 20 to select between at least two weighing ranges.

Figure 2:
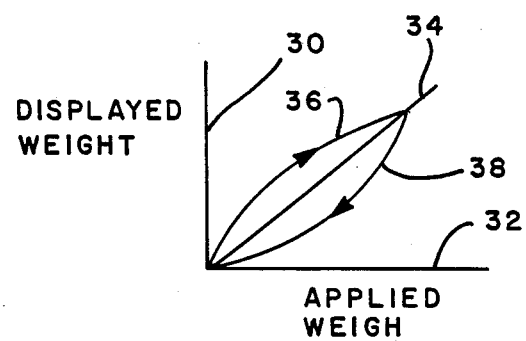
FIG. 2 is a graph of load cell characteristics pertinent to the weighing instrument of this invention.

FIG. 2 is a graph illustrative of the inaccuracies of the load cell 18, which are shown somewhat exaggerated for descriptive impact. The vertical axis 30 of the graph represents weight displayed by the display device 22, and the horizontal axis 32 of the graph represents the actual (applied) weight of an article 14. Ideally, there is a one-to-one correspondence between the displayed weight and the applied weight, which is represented by the line 34. Errors in the displayed weight as weight is increased from zero to full scale load is represented by the line 36. Errors in the displayed weight as weight is decreased from full scale load to zero is represented by the line 38. The offset between the lines 36 and 38 is referred to as "hysteresis". One skilled in the art to which this invention pertains will recognize that a high ratio of applied load to error is difficult to achieve, especially in the lower regions of applied weight, descending. The noncoincidence of the lower end of the descending line 38 with the ideal line 34 is indicative of creep and hysteresis.

Figure 2A:
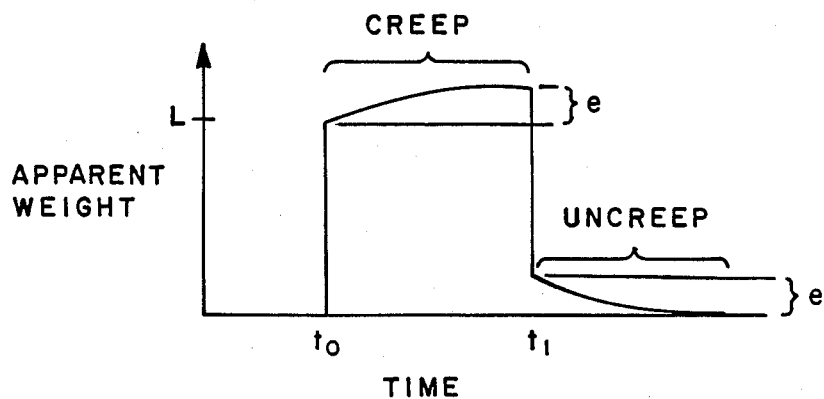
FIG. 2A is a graph of load cell characteristics pertinent to the weighing instrument of this invention.

FIG. 2A is a graph more particularly illustrative of creep in a load cell, which is inherently a time-dependent function. At $t_o$ a load L is applied to the weighing instrument. The load cell outputs a signal in proportion to the strain (or deflection) resulting from the load L. However as the time that the load is applied to the load cell increases, the load cell "creeps" so that the apparent weight of the load increases to a maximum of L+e, where e is an error in detected weight. When the load is removed at $t_1$, the load cell indicates an apparent load of e which decreases, over time, to zero as a result of "uncreep". The creep and uncreep curves are typically mirror images of one another.

The predictability of creep is an indicator of what is termed the "weighing history" of the weighing instrument, and one can conclude that the error in weighing an article increases with the time that the article is on the weighing instrument. It will become apparent that this weighing history of the instrument is a reasonably valid indicator of how the instrument is being used, i.e. as a weight classifier or as a scale.

Figure 3A:
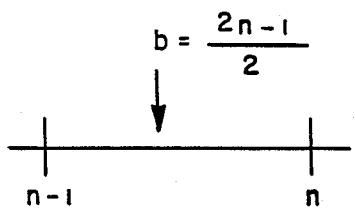
FIG. 3A is a graph of breakpoints for a scale.

FIG. 3A shows the breakpoints typically associated with a scale. For any two increments n−1 and n within the measuring range, a breakpoint b for the increments n−1 and n occurs midway between the increments, or at (2n−1)/2. Thus, for any measured value below the breakpoint, the value n−1 is displayed; and for any measured value above the breakpoint, the value n is displayed. For a measured value exactly at the breakpoint, the display of n−1 or n may be indeterminate.

Figure 3B:
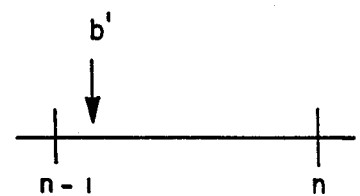
FIG. 3B is a graph of breakpoints for a weight classifier.

FIG. 3B shows the breakpoints typically associated with an electronic, digital-readout, letter/parcel weight classifier. For any two increments n−1 and n with the measuring range a breakpoint b' for the increments n−1 and n is located as near as possible to n−1, the lower of the two increments. As explained hereinbefore, it is necessary in light of the postal rate structure (e.g.) that weight be determined "up to" a rate break (e.g., one ounce). In practice, a deviation of 1/32 ounce is allowed by the postal service. Therefore it is favorable to the scale user that the breakpoint b' be established at (n−1)+1/32 ounce.

Figure 4:
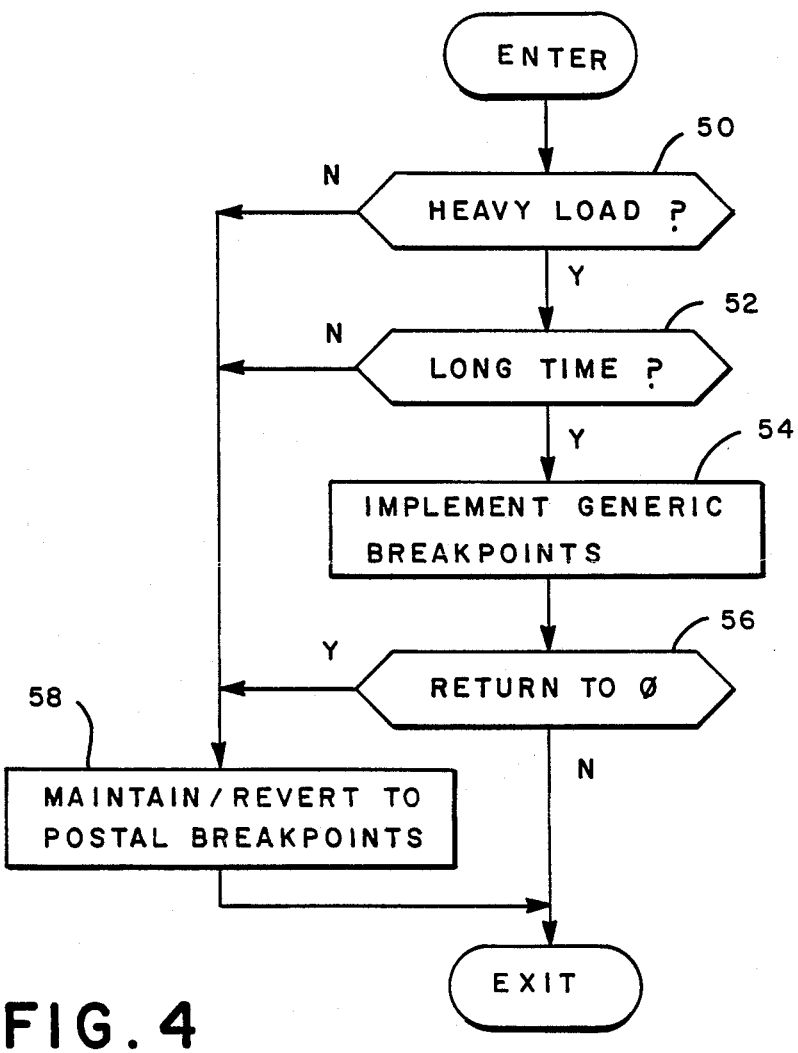
FIG. 4 is a flowchart showing the technique of this invention.

With these concepts in mind, it has been determined by the inventor that the instrument error associated with load cell creep can be minimized by adaptively establishing the breakpoints, in the following manner:

FIG. 4 shows a software routine which is readily incorporated into the weighing algorithms of any microprocessor-based weighing instrument, such as the weighing instrument 10 of FIG. 1.

In a first step (50) it is determined whether a load in excess of a substantial portion, such as 75%, of the full scale range of the instrument (e.g. 75 pounds for a 0-100 pound instrument) is on the instrument. In a second step (52) it is determined whether the "heavy" load has been on the instrument for a "long" time, such as for at least 30 seconds. When both steps yield affirmative results, in other words a "heavy" load has been on the instrument for a "long" time, the generic breakpoints are implemented (54) based on the assumption that the instrument is being used as a scale. Else, the postal breakpoints are implemented (58).

The postal breakpoints, in this example, are active in the default mode of the instrument, and may also be reimplemented (58) when the heavy load is removed. (This may be implemented by a sensed return to zero (56) of the load cell).

Thus it is readily seen how the breakpoints in an electronic measuring instrument can be made adaptive to circumstances calling for different breakpoints to be implemented, in this case based upon the weighing history of the instrument.

In the example described above, two sets of breakpoints are resident in the instrument. The postal breakpoints are implemented when the weighing history of the instrument indicates that letters are being weighed, which typically is a weighing operation of relatively short duration (vis-a-vis the "long" time of 30 seconds) and relatively little deflection of the instrument (vis-a-vis the "heavy" load of 75% deflection).

Thus, the "normal" usage of the instrument is as a postal weight classifier, but it behaves as a scale when the weighing history indicates that the user will be better served by the instrument operating in that mode.

It should be understood that the above-described implementation of "generic" and "postal" breakpoints in a weighing instrument is applicable to the concept of having adaptive breakpoints in a measuring instrument, wherein the specifics of the alternate sets of breakpoints and when they become active is tailored to the specific use(s) of the instrument. In the present example, a "heavy" load for a "long" time serves as a useful indicator of "weighing history" for the alternate modal operation of the weighing instrument as a "scale" or a "weight classifier".

The various weighing algorithms required for implementing both the generic and postal breakpoints are readily stored in a memory device, such as a Programmable Read Only Memory (PROM) 60, associated with the weighing instrument. The techniques described herein are well within the skill of one of ordinary skill in the art to which this invention pertains, insofar as implementing the invention in a particular weighing instrument is concerned.

I claim:

1. An electronic weighing instrument for weighing an article, comprising:
    weighing means for receiving an article and for providing a first signal indicative of the weight of the article; and
    a microprocessor for providing a second signal based on predetermined weighing algorithms involving breakpoints between successive weighing intervals;
    wherein in a first mode of operation, the second signal is determined in accordance with postal breakpoints; and wherein in a second mode of operation, the second signal is determined in accordance with generic breakpoints.

2. An electronic weighing instrument according to claim 1, further comprising:
   a digital display receiving the second signal and indicating article weight.

3. An electronic weighing instrument according to claim 1, further comprising:
   means for selecting between the first mode and the second mode of operation based on the duration of a nonzero second signal.

4. An electronic weighing instrument according to claim 3, wherein the second mode of operation is selected when the duration of the nonzero second signal exceeds a threshold time interval.

5. An electronic weighing instrument according to claim 4 wherein the threshold time interval is 10 seconds.

6. An electronic weighing instrument according to claim 4 wherein the first mode of operation is selected whenever the second signal returns to zero.

7. An electronic weighing instrument according to claim 1, further comprising:
   means for selecting between the first mode and the second mode of operation based on an increase in the magnitude of the second signal.

8. An electronic weighing instrument according to claim 7 wherein the first mode of operation is selected whenever the second signal returns to zero.

9. An electronic weighing instrument according to claim 7 wherein the second mode of operation is selected based on an increase in the magnitude of the second signal and consequent attainment by the second signal of a substantial portion of the full range load capability of the weighing instrument.

10. An electronic weighing instrument according to claim 9 wherein the substantial portion is 75% of the full scale range of the weighing instrument.

11. An electronic weighing instrument according to claim 1, further comprising:
    means for selecting the second mode of operation when a "heavy" weight is on the weighing instrument for a "long" time.

12. An electronic weighing instrument according to claim 11, wherein:
    the "heavy" weight is at least 75% of the full scale deflection of the weighing instrument; and
    the "long" time is 30 seconds.

13. A method of weighing an article with an electronic weighing instrument capable of operating in two modes of operation, the instrument employing postal breakpoints between successive weighing intervals in the first mode and employing generic breakpoints between successive weighing intervals in the second mode, the method comprising:
   (a) determining if a heavy load is on the instrument;
   (b) if a heavy load is on the instrument, determining whether the heavy load has been on the instrument for a long time;
   (c) causing the instrument to operate in the second mode if a heavy load has been on the instrument for a long time; and
   (d) causing the instrument to operate in the first mode if it is not the case that a heavy load has been on the instrument for a long time.

14. The method according to claim 13, wherein:
    a load of at least 75% of the full scale deflection of the weighing instrument is determined to be heavy; and
    a period of 30 seconds or more is determined to be a long time.

* * * * *